(12) United States Patent
Berchowitz

(10) Patent No.: US 11,460,325 B2
(45) Date of Patent: Oct. 4, 2022

(54) METHOD FOR AND CONTROL SYSTEM WITH PISTON AMPLITUDE RECOVERY FOR FREE-PISTON MACHINES

(71) Applicant: Global Cooling, Inc., Athens, OH (US)

(72) Inventor: David M Berchowitz, Athens, OH (US)

(73) Assignee: GLOBAL COOLING, INC., Athens, OH (US)

( * ) Notice: Subject to any disclaimer, the term of this patent is extended or adjusted under 35 U.S.C. 154(b) by 265 days.

(21) Appl. No.: 16/919,689

(22) Filed: Jul. 2, 2020

(65) Prior Publication Data

US 2022/0003574 A1     Jan. 6, 2022

(51) Int. Cl.
| | |
|---|---|
| G01D 5/20 | (2006.01) |
| H02P 7/02 | (2016.01) |
| H02P 29/60 | (2016.01) |
| F25B 9/14 | (2006.01) |
| H02K 41/035 | (2006.01) |

(52) U.S. Cl.
CPC ............ *G01D 5/2013* (2013.01); *F25B 9/14* (2013.01); *H02K 41/035* (2013.01); *H02P 7/02* (2016.02); *H02P 29/60* (2016.02); *F25B 2309/001* (2013.01); *F25B 2309/1428* (2013.01)

(58) Field of Classification Search
CPC ......... G01D 5/2013; H02P 7/02; H02P 29/60; F25B 9/14; F25B 2309/001; F25B 2309/1428; H02K 41/035
See application file for complete search history.

(56) References Cited

U.S. PATENT DOCUMENTS

| | | | |
|---|---|---|---|
| 4,602,174 A | | 7/1986 | Redlich |
| 5,040,372 A | * | 8/1991 | Higham ................. H02K 33/00 60/520 |
| 5,342,176 A | | 8/1994 | Redlich |
| 2005/0039454 A1 | | 2/2005 | Shimizu et al. |
| 2008/0061770 A1 | | 3/2008 | Holliday |
| 2008/0303289 A1 | * | 12/2008 | Holliday ................. F02G 1/043 290/40 C |
| 2012/0019079 A1 | | 1/2012 | Ziegler et al. |
| 2013/0042607 A1 | | 2/2013 | Berchowitz |

OTHER PUBLICATIONS

Redlich, Robert Ph.D, et al., Linear Compressors: Motor Configuration, Modulation and Systems, Presented at the 1996 International Compressor Engineering Conference, Purdue University, IN 47907-1077, Jul. 23-26, 1996.

* cited by examiner

*Primary Examiner* — Zoheb S Imtiaz
(74) *Attorney, Agent, or Firm* — Brown & Michaels, PC

(57) ABSTRACT

A method and apparatus for detecting the displacement amplitude of an armature of a linear motor or alternator that is drivingly coupled to a load or prime mover. The method and apparatus require only three inputs all derived from the input terminals of the linear motor or alternator: (1) the voltage measured across the linear motor terminals; (2) the current consumed by the linear motor; and (3) the phase between the voltage and current. The three inputs are sensed at the terminals of the linear motor or alternator and used to perform mathematical calculations in the microcomputer of a control system or controller. The mathematical calculations are based on equivalent circuits that are modifications of the equivalent circuit for the linear motor or alternator. The detected displacement amplitude can be used by a controller to limit the displacement amplitude of the armature to prevent collisions.

6 Claims, 5 Drawing Sheets

FIG. 3
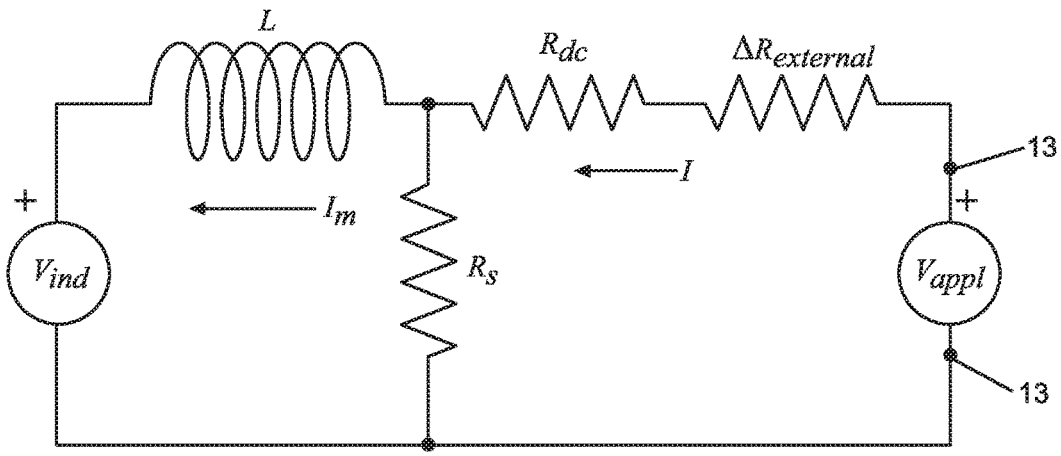
FIG. 4
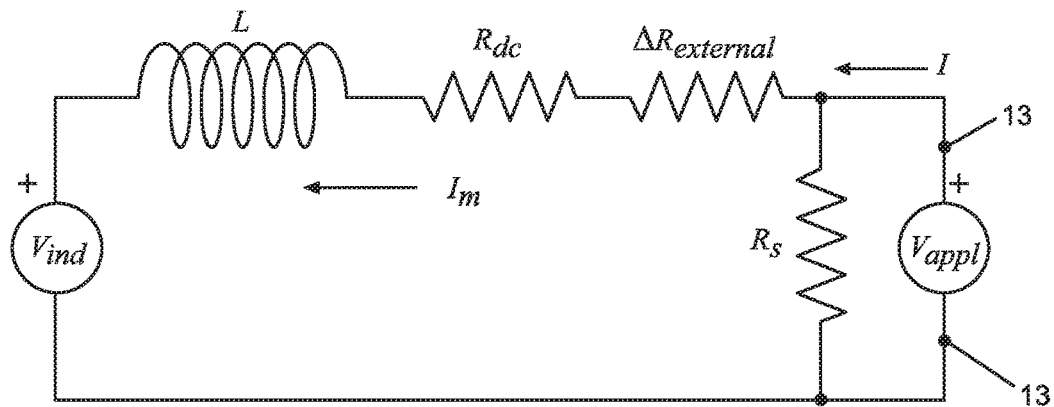
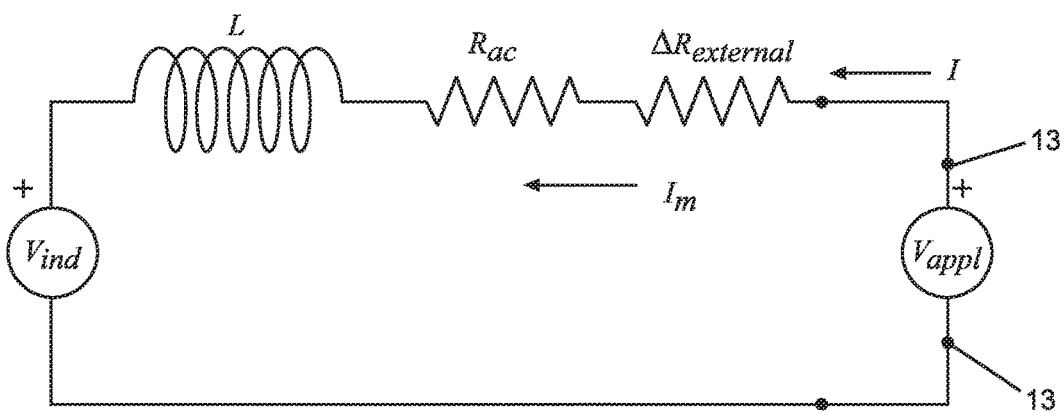
FIG. 5

METHOD FOR AND CONTROL SYSTEM WITH PISTON AMPLITUDE RECOVERY FOR FREE-PISTON MACHINES

BACKGROUND OF THE INVENTION

This invention relates to both control of a linear motor connected to drive a load, such as a free piston Stirling cooler, and control of a linear alternator connected to be driven by a prime mover, such as a Stirling engine. More particularly the invention is directed to a method and apparatus that allow the displacement amplitude of the linear motor or alternator to be repeatedly detected by computing the displacement amplitude based on equations that require, as their only input parameters, the sensed voltage, sensed current and sensed power factor that are readily accessible at the motor or alternator terminals. Consequently, no electromechanical device is required for directly sensing displacement amplitude. The invention allows computations that are sufficiently simple and able to be performed within a sufficiently short time interval that they can be performed with controller computing circuits that are practical for use in commercially offered products. The equations that are applied in the invention are based upon assuming particular modifications of the motor or alternator circuit that simplify the computations and yet introduce only a minor insignificant difference between the actual displacement amplitude and the computed amplitude.

As used in this document, the term "amplitude", when applied to a reciprocating mechanical structure, such as a piston or armature, means the coefficient of the sine function that defines the periodic, sinusoidal displacement of the mechanical structure as a function of time. It is commonly also referred to as one half of the stroke. Similarly, when applied to a sinusoidally alternating electrical parameter, such as voltage or current, "amplitude" means the coefficient of the sine function that defines the variation of the instantaneous value of the electrical parameter as a function of time. It is also referred to as one half of the peak to peak value. When the armature of a linear motor or alternator is drivingly linked to another structure, such as when the armature of a linear motor linked to a piston of a Stirling cooler, the displacement amplitude of all the linked components that are rigidly attached together is identical in amplitude and phase. Because they are moving together as a unit they can be referred to and mathematically represented as a part of the armature. As known to those skilled in the art, sinusoidally varying voltages and currents can be described in terms their amplitude or alternatively in terms or their root-mean-square value abbreviated as rms value. They differ by the constant coefficient $1.414 = \sqrt{2}$. Consequently, voltages and currents described in this document can be defined in terms of either rms or amplitude.

Electrical linear motors and linear alternators are commonly known devices for driving a diverse variety of mechanical loads in reciprocation or for converting the linear reciprocation of another type of prime mover into alternating electric current. Those skilled in the art recognize that a linear motor and a linear alternator are the same basic electrical and mechanical structure. Each has a stator, sometimes referred to as a primary, with electrical coil windings, and also has a reciprocating armature, sometimes referred to as a secondary, actuator, slider or translator.

In a similar manner, free piston Stirling machines, which have the same basic mechanical structure, can be operated as prime movers for driving other loads, including a linear alternator, by the application of a heat source or they can be operated as a cooler or heat pump by being driven by a prime mover including a linear motor. A free piston Stirling machine has a reciprocating piston and a reciprocating displacer. The piston can be driven by a prime mover to operate as a cooler/heat pump or the piston can be connected to a mechanical load and the Stirling machine operated as a motor. In this document, the term "coupled machines" is used to refer to a linear motor driving a load, such as a Stirling cooler, and to a linear alternator driven by a prime mover, such as a Stirling engine. The invention is applicable to various coupled machines known in the prior art but is described as a linear motor driving a Stirling cooler as an example.

The amplitude of reciprocation of a linear motor or alternator and the amplitude of reciprocation of the piston of a Stirling machine are not limited or confined by any motion conversion structure such as a crankshaft and connecting rods. Instead, when the reciprocating armature of a linear motor or alternator is coupled to another machine, such as the reciprocating piston of a free piston Stirling machine, all the reciprocating components are "free" to reciprocate over a range of displacement amplitudes that is limited only by a collision of a reciprocating component of one of the coupled machines with a stationary component of one of the machines.

Because such collisions can damage or destroy either or both of the coupled machines, it is desirable to avoid collisions that result from an excessive displacement amplitude of the reciprocating component of free piston coupled machines. With a linear motor or alternator that is coupled to a free piston Stirling machine it is relatively easy to measure the displacement amplitude at which a collision occurs. This can be done by manually sliding the armature at a low velocity in both directions until a collision is felt or heard and then recording the displacement. Knowledge of the smallest displacement amplitude $X_c$ at which a collision occurs allows an engineer to define a maximum displacement amplitude $X_{max}$ that is sufficiently less than the collision displacement amplitude $X_c$ that a collision can be avoided. Consequently, it is desirable to continuously detect the operating displacement amplitude X as an electrical data parameter that is proportional to displacement amplitude, in free piston coupled machines. It is particularly desirable to be able to detect the displacement amplitude X from electrical parameters that are conveniently available at electrical terminals that are already being used with free piston coupled machines in order not only to avoid the need for a separate, additional sensor for sensing displacement amplitude but also to avoid providing special additional electrical connection terminals.

As is well known, linear motors and alternators are the devices generally used to drive, or to deliver power from, free-piston machinery. The amplitude of the piston of a Stirling cooler, while primarily determined by the voltage of the linear motor driving it, is also strongly influenced by the power consumed or delivered by the machine. It is therefore difficult to know what maximum voltage is possible for all operating conditions because the drive voltage itself is not an accurate function of the displacement amplitude. In the following, to simplify the prose, the invention will be described solely for a power absorbing device, knowing that a power producing device is simply the inverse situation.

During start-up of a Stirling cooler, current practice often resorts to applying a slowly ramping drive voltage to the terminals of the linear motor in order to prevent the linear motor from driving the Stirling cooler's piston into collisions with its mechanical stops—generally referred to as over-stroked. In the prior art controller of a Stirling cooler driven by a linear motor, a steady-state operating voltage typically is stored in and retrieved from a look-up table. This technique suffers from changing load conditions that alter the behavior of the machine and therefore the ramp time may not be enough to bring the machine to the required condition before full power is applied. A further difficulty is that changing machine characteristics due to wear or gas leakage will lead to incorrect voltage parameters. Of course, in any scheme, it is possible to simply include in the design a sufficient buffer zone or buffer gap for the piston motions to avoid the possibility of collision. But this approach results in dead space or unused capacity since power is dependent on the square of the piston amplitude. In applications such as deep temperature freezers, it is important to obtain the fastest initial cool-down and recovery after door openings in order to limit the exposure of the high value freezer contents to extended temperature fluctuations. This can only be achieved by operating the free-piston cooling machine at its maximum capacity, which is also the maximum allowable piston amplitude. Therefore it is desirable to bring the displacement amplitude of the Stirling cooler's piston to the greatest possible amplitude as soon as is possible without incurring any collisions.

R. W. Redlich in U.S. Pat. No. 5,342,176 describes a method to obtain piston amplitude by providing an analog equivalent, either by discrete components or digitally, i.e., essentially a simulation of the free-piston device. Redlich's method does provide the piston amplitude in what has been termed a method of reconstruction. However, it requires analog or digital integration to solve the describing equation, in his case the velocity of the reciprocating piston. Though Redlich needs only two inputs, the instantaneous voltage and current, the method of integration requires substantial computational power and time and is subject to numerical inaccuracies.

In order to effectively control a free-piston machine driven by a linear motor, it is important to know the voltage for maximum piston amplitude at any load or machine condition so that the maximum power point can be obtained without the piston exceeding its maximum amplitude $X_{max}$. Consequently, it is desirable, and a purpose and feature of the invention, to enable the continuous detection of the displacement amplitude X of the reciprocating component of coupled machines, such as the piston and armature of a linear motor driving a free piston Stirling cooler, for any changing load or changing machine conditions.

SUMMARY OF THE INVENTION

The invention consists of a method and apparatus for detecting, under any operating condition, the displacement amplitude of an armature of a linear motor or alternator that is drivingly coupled to a load or prime mover. The method and apparatus require only three inputs all derived from the input terminals of the linear motor or alternator: (1) The RMS or peak voltage measured across the linear motor terminals; (2) The RMS or peak current consumed by the linear motor; and (3) The phase between the voltage and current which can be obtained from the power factor. The method senses those three inputs at the terminals of the linear motor or alternator and uses them to perform mathematical calculations in the microcomputer of a control system or controller. The mathematical calculations are based on equivalent circuits that are particular simplifying modifications of the equivalent circuit for the linear motor or alternator. The recovered or detected displacement amplitude is used by a control or controller to limit the displacement amplitude of the armature to an amplitude $X_{max}$ that is less than an amplitude $X_c$ that would cause a collision of the reciprocating armature with stationary a component.

BRIEF DESCRIPTION OF DRAWINGS

FIG. 3 is a circuit schematic diagram of an equivalent circuit for a linear alternator or for a linear motor such as those illustrated in FIGS. 1 and 2.

FIG. 4 is a circuit schematic diagram of an equivalent circuit for a linear alternator or for a linear motor and is a simplified modification of the circuit of FIG. 3 and is a basis for an explanation of equations used for embodiments of the invention.

FIG. 5 is a circuit schematic diagram of an equivalent circuit for a linear alternator or for a linear motor and is a further simplified modification of the circuit of FIG. 4 and is a basis for an explanation of equations used for embodiments of the invention.

Figure 1:
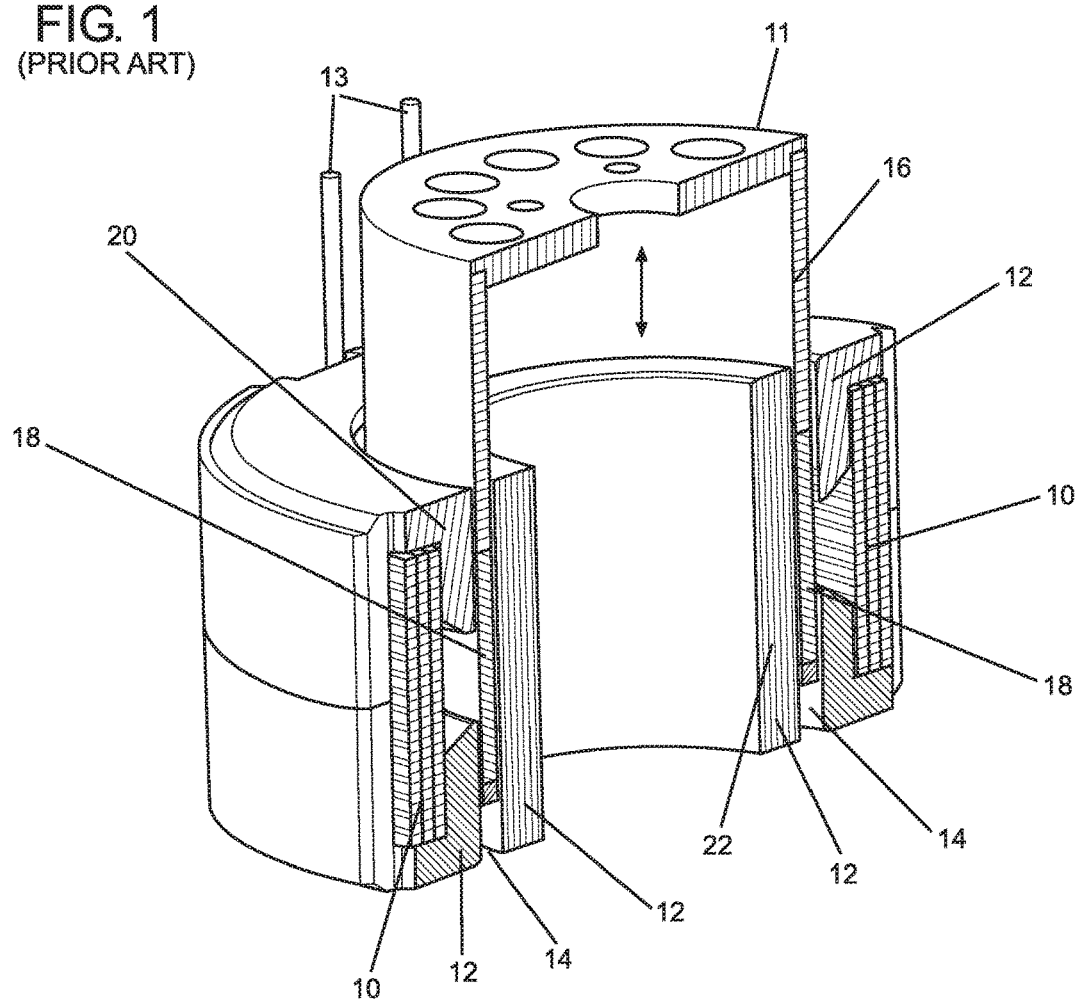
FIG. 1 is a view in axial section of a linear motor that is a component part of a coupled linear motor driving a free piston Stirling cooler that represent an embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other circuit elements where such connection is recognized as being equivalent by those skilled in the art. In addition, circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

In the following description, magnet amplitude, piston amplitude and armature amplitude are all displacement amplitude, are synonymous and have the identical magnitude (value). The term "ideal" has the meaning that is associated with the practice of forming an equivalent circuit from lumped, idealized circuit elements as well known to those skilled in the art of circuit analysis.

Recognizing that the amplitude of the magnet is described by a practically linear system and that a linear motor itself is practically linear, it is possible to form an equivalent circuit from which the magnet amplitude can be extracted for a given applied voltage and current. From the voltage and current and their phase relationship to each other, it is then possible to extract the ideal induced voltage of the motor. This ideal induced voltage (RMS or peak) is proportional to the velocity amplitude of the magnet and, since the frequency is known, the amplitude may be computed directly. The algorithm for doing so is only a few lines of code and can be calculated after each cycle or after several cycles since the machine does not respond quickly to a load change.

The following description begins with a description of the contents of the Figures and is followed by an analysis describing the basis for the mathematical relationships used in the invention.

Figure 2:
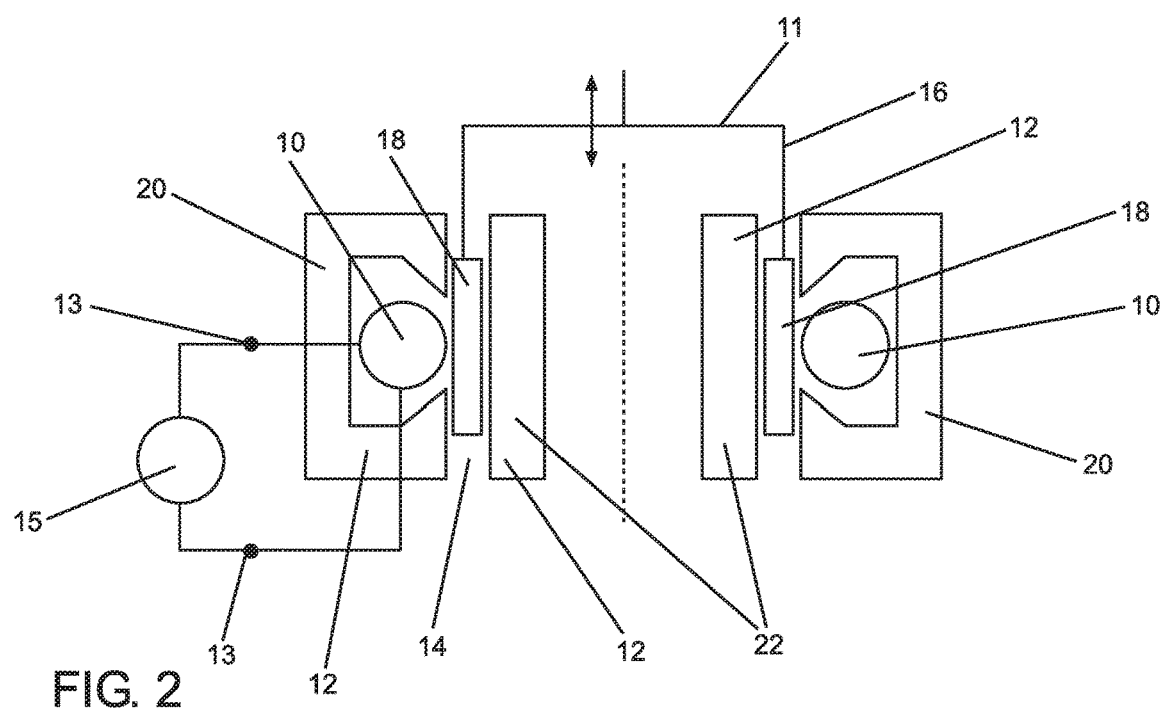
FIG. 2 is a diagrammatic illustration of the linear motor of FIG. 1.

FIG. 1 shows a section view of a typical linear motor of the type devised by Redlich as used in free-piston machines. FIG. 2 is a schematic or diagrammatic view of the linear motor that is represented in FIG. 1 using the same reference numbers in both figures. Referring to FIGS. 1 and 2, a toroidal coil winding 10 within an iron core 12 creates a magnetic field across a radial air gap 14 that is perpendicular to the faces of the core 12 at the boundary of the air gap 14. A reciprocating armature 11 has a ring 16, which is made up of radially polarized rectangular permanent magnets 18 (or a ring permanent magnet) within the air gap 14. The magnets 18 are moved axially within the iron core 12 in response to an alternating voltage 15 (FIG. 2) applied to the winding terminals 13 (FIG. 2) to drive current through the coil 10. The coil 10 is shown in the outer iron part 20 of the core 12. Alternatively, it is often convenient to place the winding within the inner iron part 22 of the core 12.

FIG. 3 shows an equivalent circuit for a linear motor that is disclosed in the prior art by Redlich, Unger and van der Walt. $R_s$ represents losses due to eddy currents and hysteresis induced by the motion of the magnets with the coil windings open-circuited. $R_{dc}$ represents the Ohmic loss in the coil and $\Delta R_{external}$ represents induced losses in the surrounding structure of the motor. L is the inductance of the motor mainly due to the coil windings. $V_{ind}$ is the open circuit voltage induced by the magnet motion and $V_{appl}$ is the applied terminal voltage. I and $I_m$ are the terminal and motor currents, respectively.

Because FIGS. 3, 4 and 5 are equivalent circuits comprised of lumped ideal circuit elements, the only terminals that are available for a real linear alternator or motor are the terminals of the voltage source $V_{appl}$. Those are the alternator or motor terminals that are referred to in this description. Persons skilled in the art will recognize that there are techniques known to those skilled in the art for obtaining, such as from laboratory testing, the values of the constants representing the resistance and inductance circuit elements of the components of the equivalent circuits. The described resistive losses for prior art linear motors are well known. The values of these constants are stored in the microcomputer of the controller and can be used for subsequent data processing.

FIG. 4 shows a modification of the circuit of FIG. 3 that provides a practical equivalent circuit on which the invention is based. The equivalent circuit of FIG. 4 provides a close approximation to the equivalent circuit in FIG. 3. This modification is based on an observation that, in practice, the voltage across $R_s$ is much greater than the voltage across $R_{dc}+\Delta R_{external}$. This provides a simplification as follows:

Voltage across $R_s \approx V_{app}$

Therefore, to a good approximation, the practical equivalent circuit of FIG. 4 is applicable. This circuit modification permits a simplification of the calculation of the displacement amplitude.

FIG. 5 shows an equivalent circuit that is a further simplification. In the FIG. 5 equivalent circuit all the induced losses due to magnet motion are bundled into the $R_{ac}$ equivalent circuit resistance. Here no energy dissipation occurs with the terminals open-circuited, which leads to some additional inaccuracy. For the equivalent circuit of FIG. 5 $I_m=I$.

Figure 6:
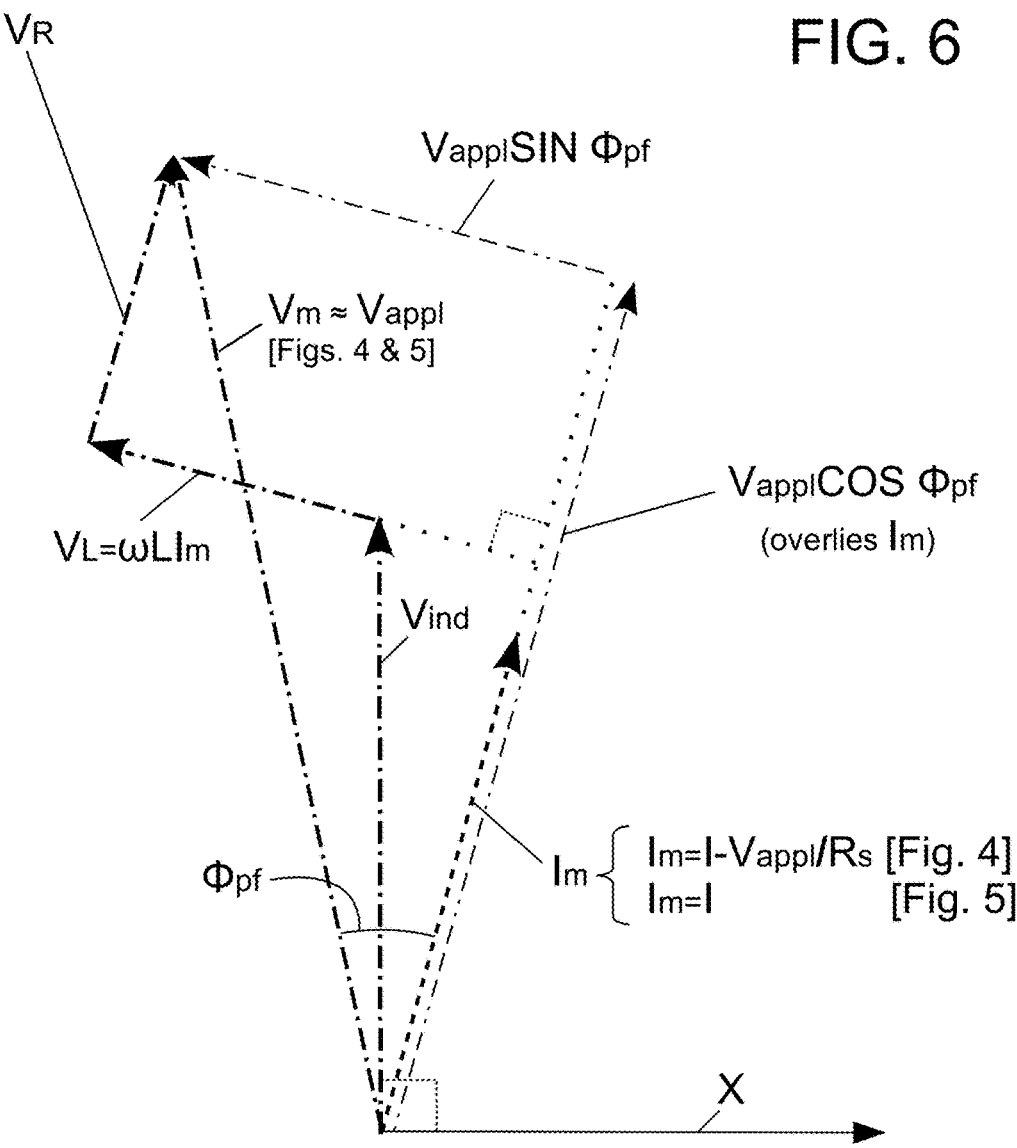
FIG. 6 is a phasor diagram showing relationships of electrical parameters for the equivalent circuits of FIG. 3-5.

FIG. 6 shows the phasor relationship of the voltages and motor current. The motor current is the current $I_m$ that flows through the windings of coil 10. X is the displacement amplitude of the magnets, $V_{ind}$ is in phase with the velocity of the magnets and hence in quadrature with the displacement of the magnets. Resistive voltages are in phase with the current $I_m$ and inductive voltages are in quadrature with the current $I_m$.

Figure 7:
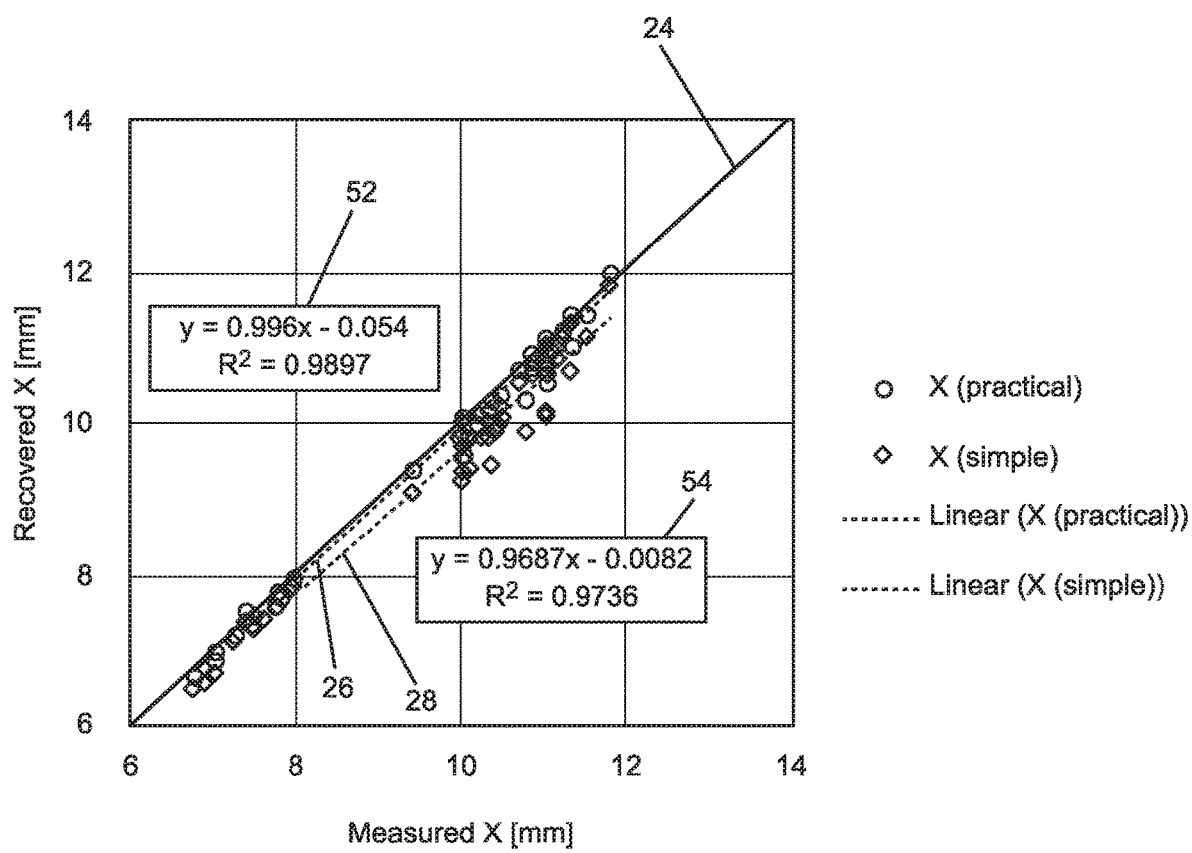
FIG. 7 is a graph of magnet displacement amplitudes that were recovered in accordance with to the invention as based on the two equivalent circuits of FIGS. 4 and 5 versus a measured amplitude.

FIG. 7 shows a graph comparing the magnet displacement amplitude X that was recovered according to the invention based on equations developed from the two equivalent circuits of FIGS. 4 and 5 versus the actual measured displacement amplitude. FIG. 7 illustrates how closely the displacement amplitude X that is detected (recovered) according to the invention approximates the actual measured displacement amplitude. The line 24 shows the actual measured displacement amplitude. The line 26 (dotted) shows the displacement amplitude X recovered (detected) according to the invention based on equations developed from the FIG. 4 equivalent circuit. The line 28 (dotted) shows the displacement amplitude X recovered (detected) according to the invention based on equations developed from the FIG. 5 equivalent circuit.

Figure 8:
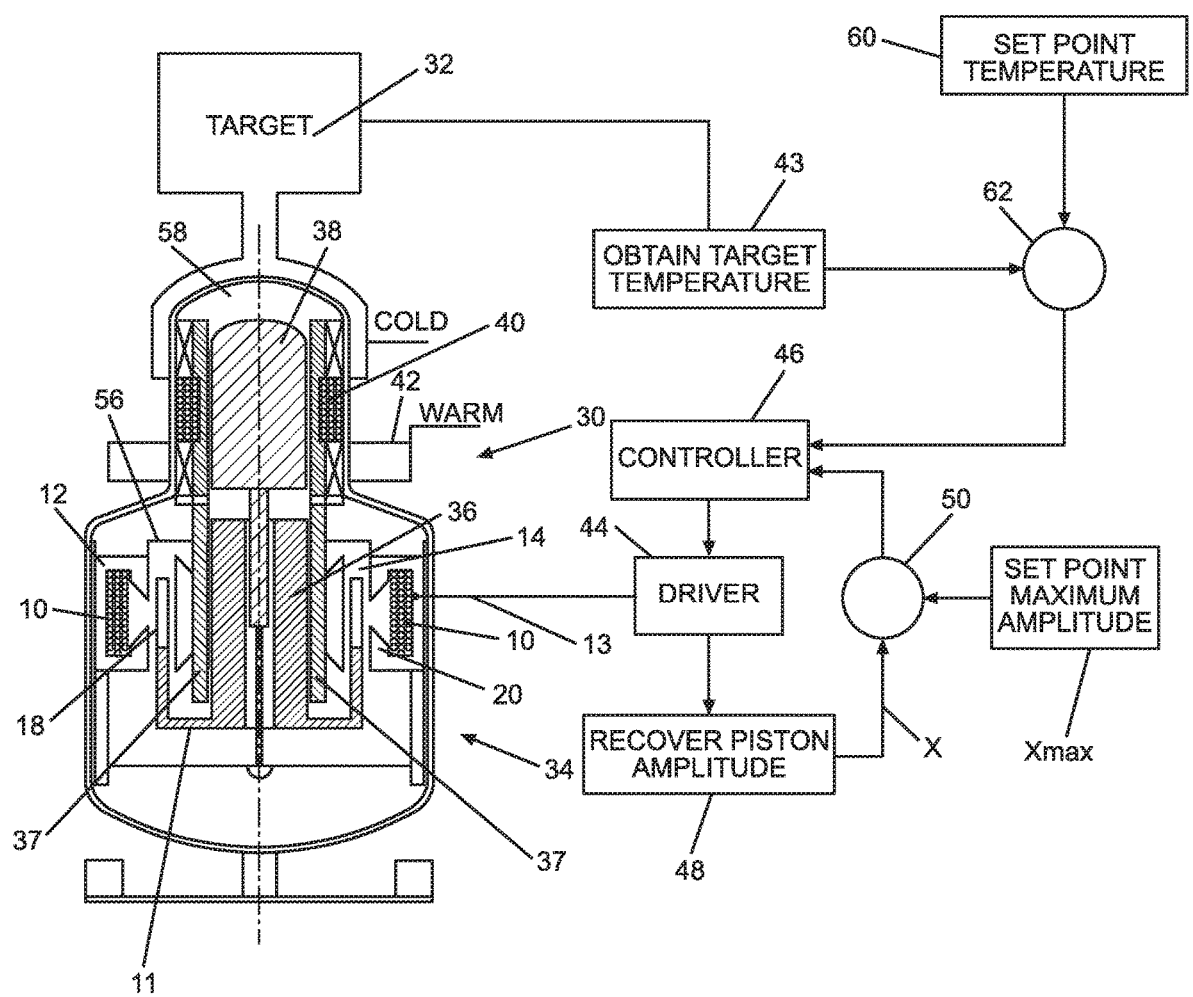
FIG. 8 illustrates an apparatus for applying the invention in a control circuit for a free piston Stirling cooler.

FIG. 8 shows the displacement amplitude recovery method embodied in a controller for a free-piston Stirling cooler to obtain a signal representing piston displacement amplitude X for use in a feedback control system. Most of the circuit arrangement shown in FIG. 8 is known in the prior art. The prior art components are described first and in a summary manner because they are known in the prior art to persons of ordinary skill in the art. A free piston Stirling cooler 30 absorbs heat from a target 32 such as an ultracold freezer. The Stirling cooler 30 has a linear motor 34 constructed internally within its back space. The component parts of the linear motor 34 are the same as described in connection with FIGS. 1 and 2 and therefore the same reference numbers are applied to those component parts. The piston 36 of the Stirling cooler is fixed to the magnets 18 of the linear motor 34 which drive the piston 36 in reciprocation within a cylinder 37 as a result of the alternating voltage applied to the coil 10. As well known in the free piston Stirling machine field, pressure variations within the Stirling cooler cause the displacer 38 to reciprocate. The reciprocations of the displacer 38 pushes the working gas within the cylinder 37 periodically in alternate directions through a regenerator 40. Heat is conducted from the target to the upper cold end of the Stirling cooler 30 and pumped by the periodic motion of the working gas combined with the periodic pressure variations within the cylinder from the upper cold end of the Stirling cooler 30 to a heat exchanger 42 from which the heat is transferred to the ambient atmosphere. The periodic motion of the working gas combined with the periodic pressure variations within the cylinder cause heat to be pumped out from the upper cold end of the Stirling cooler 30 and the target 32 to a heat exchanger 42 from which the heat is transferred to the ambient atmosphere. Stirling coolers also have a driver 44 that applies an alternating voltage to the coil 10 of the linear motor 34. The amplitude of that drive voltage is controlled by a controller 46. Under steady state operating conditions, following a start-up sequence, negative feedback control principles are applied to maintain the target temperature at a set point temperature. For that purpose a temperature sensor 43 applies a signal representing the target temperature to a summing junction 62 to which a signal representing the set-point temperature is also applied. The error between the two causes the driver 44 to vary the voltage applied to the linear motor in a manner to maintain the target temperature at the set point temperature. All this is accomplished according to long-established control principles and typically is performed by digital processing.

In order to practice the invention, the piston displacement amplitude must be computed according to the mathematical operations to be described below. The piston displacement amplitude is recovered from electrical parameters that are sensed at the coil terminals 13, which are available to the driver 44, as illustrated at block 48. The recovered (detected) piston displacement amplitude X is applied to a summing junction 50 to which a set point maximum displacement amplitude $X_{max}$ is also applied. The error signal from the summing junction 50 is then applied to the controller which limits the displacement amplitude so that it does not exceed $X_{max}$.

Of course, as known to those skilled in the technology, all the summing junction operations, the voltage limiting operations and the performance of calculations according to equations are typically done by digital processing within the controller. A modern controller includes a microcomputer. The term "microcomputer" is used to identify a computing circuit of the type commonly used in the prior art to perform computing operations for control circuits. It is not intended to be directed to its alternative meaning of a desktop, laptop or other form of user interactive computer that includes peripheral equipment such as monitors, keyboards and a mouse. Because the processing is performed by the controller's microcomputer, the physical sensing devices and circuits that are electrically connected to the coil terminals for sensing coil voltage and current can transfer their I, and V outputs directly to the controller where calculation of the phase (power factor) and all the other mathematical calculations can be performed.

Turning now to an analysis showing the foundation of the invention, a fundamental aspect of linear motor theory is that the induced voltage, $V_{ind}$ is directly proportional to the magnet axial velocity $\omega X$, where $\omega$ is the frequency in radians per second and X is the displacement amplitude. For a Stirling cooler driven by a linear motor, the frequency $\omega$ is the frequency of the AC voltage driving the linear motor and typically the resonant frequency of the coupled machines. The proportionality constant $\alpha$, commonly known in the art as the motor constant, with units Volts seconds per meter or Newtons per Amp that are numerically identical, allows the induced voltage to be written:

$$V_{ind} = \alpha \omega X \quad (1)$$

Equation (1) shows that, by obtaining or inferring $V_{ind}$, and knowing $\alpha$ and $\omega$, it is possible to obtain the magnet and hence the armature displacement amplitude X.

FIG. 1 shows a typical linear motor where the armature 11 is caused to oscillate axially with an amplitude X. The magnets 18, which are radially polarized, are attached to and form a part of the armature 18. The circumferential coil 10 winding provides an alternating field in the outer and inner iron core components 20 and 22 respectively. The coil 10 has electrical terminals 13. When an alternating voltage is applied to the terminals 13 of coil 10, the stator field generated by the coil 10 crosses the air gaps 14 between the iron core components 20 and 22. The field within the air gaps 14 will interact with the magnet edge currents of the magnets 18, which are essentially circumferential, to provide the force that will move the magnets 18, and hence the armature 11 in oscillatory reciprocation in the axial (vertical in FIGS. 1 and 2) direction. This is shown schematically in FIG. 2 where all the elements have been identified by the same numbers as in FIG. 1. The applied alternating voltage at terminals 13 is $V_{appl}$.

In the equivalent circuit for the linear motor that is shown in FIG. 3, $R_s$ accounts for the eddy current and hysteresis losses associated with magnet motion with the coil 10 open-circuited. The DC resistance of the coil 10 is accounted for by $R_{dc}$ while losses associated with induced currents in the supporting structure are represented by $\Delta R_{external}$. The inductance L is mainly associated with the coil 10 windings but includes small contributions from other sources as well, e.g. the stator iron core components 20 and 22. When an alternating voltage $V_{appl}$ is applied at terminals 13, current I flows. The induced open-circuit voltage associated with magnet motion is $V_{ind}$.

In the analysis that follows, peak values are used. It is recognized that RMS values will function just as well except that the factor $\sqrt{2}$ would need to be applied to the voltages and currents in the following equations.

From circuit analysis applied to the equivalent circuit of FIG. 3, it is possible to obtain the induced voltage $V_{ind}$ in terms of the terminal voltage and current as follows:

$$V_{ind} = V_{appl}\left(1 + j\frac{\omega L}{R_s}\right) - I\left[j\omega L\left(1 + \frac{R_{dc} + \Delta R_{external}}{R_s}\right) + R_{dc}\right] \quad (2)$$

Where the j denotes the imaginary term $\sqrt{-1}$.

While it is certainly possible to use Equation (2) to obtain the induced voltage $V_{ind}$ from the terminal voltage $V_{appl}$ and current I, it would require computational power that is not always conveniently available and cost effective in a small on-board microcomputer.

The practical equivalent circuit of FIG. 4 is a very close approximation to the equivalent circuit of FIG. 3 because the voltage across $R_s$ is much greater than the voltage across $R_{dc} + \Delta R_{external}$. Therefore, Rs may be moved from its position in FIG. 3 to its position in FIG. 4, which is shunted directly across the terminals 13 of the coil 10 of the linear motor. The current $I_m$ can then be expressed as:

$$I_m = I - \frac{V_{appl}}{R_s} \quad (3)$$

All other elements remain the same.

Referring to FIG. 6, the voltage-current phasor diagram for the motor, $I_m$ is known from equation (3) and the voltage across the motor is $V_{appl}$ for the practical equivalent circuit.

The power factor pf, like the voltage $V_{appl}$ and the current I can be measured by one of several conventional devices, circuits and methods that are well known in the prior art. The simplest and most common method used in the prior art for determining power factor is to compute real power (or true power) and compute apparent power. The quotient of these two is the power factor.

From the power factor pf, we obtain the phase angle $\emptyset_{pf}$ between $V_{appl}$ and I.

$$\emptyset_{pf} = \cos^{-1}(pf) \quad (4)$$

Looking at the voltage-current relationship shown by the phasors in FIG. 6, and bearing in mind that $V_m = V_{appl}$, components of $V_{ind}$ can be computed. One component is in the I direction and one component is normal to the I direction (i.e. the quadrature direction of the voltage across an inductor as a function of current I). As seen graphically in FIG. 6 and using equation (3) these components are computed by:

$$(V_{ind})_I = V_{appl} \cos \emptyset_{pf} - (R_{dc} + \Delta R_{external})I_m$$
(component in I direction) (5)

and $$(V_{ind})_L = V_{appl} \sin \emptyset_{pf} - L\omega I_m \text{ (comp. in } L\omega I_m,$$
normal to $I_m$ direction) (6)

Using equation (1) and the theorem of Pythagoras, the magnet (armature) amplitude follows from the magnitude of the components of $V_{ind}$:

$$X = \frac{1}{\omega \alpha} \sqrt{(V_{ind})_I^2 + (V_{ind})_L^2} \quad (7)$$

This is an accurate result but will vary to some degree with changes in motor constants due to temperature effects and/or other non-linearities that may, of course, be accounted for with appropriate and known functional relationships.

Thus, knowing the phasor relationship of voltage and current in addition to basic motor parameters, it is possible to extract (or recover) the magnet amplitude. This non-invasive means to determine amplitude is useful in control systems.

For the simple equivalent circuit of FIG. 5, $I_m = I$ and, as mentioned, the induced losses due to magnet motion are handled entirely by $R_{ac}$. The circuit of FIG. 5 has slightly more severe assumptions than the circuit of FIG. 4 and they introduce some additional error. For the circuit of FIG. 5, the two voltage components of $V_{ind}$ would be given by:

$$(V_{ind})_I = V_{appl} \cos \emptyset_{pf} - (R_{ac} + \Delta R_{external})I \text{ (component in I direction)} \quad (8)$$

$$(V_{ind})_L = V_{appl} \sin \emptyset_{pf} - L\omega I \text{ (component in } L\omega \text{ direction, normal to I direction)} \quad (9)$$

The computed components from equations (8) and (9) are then applied in equation 7 to obtain the magnet amplitude.

The recovered amplitudes of the practical equivalent circuit of FIG. 4 and the simple equivalent circuit of FIG. 5 are shown plotted against measured values of magnet amplitude in FIG. 7. The recovered amplitude correlation for the practical equivalent circuit of FIG. 4 is shown at 52 in FIG. 7 and for the simple equivalent circuit of FIG. 5 is shown at 54 in FIG. 7. The practical equivalent circuit (FIG. 4) has better correlation than the simple equivalent circuit (FIG. 5) though for some applications, this difference may not be significant.

The magnet amplitude recovery method of the invention is easily integrated into a control system for linear machinery. FIG. 8 shows how the magnet amplitude recovery method may be used to obtain the piston amplitude in a free-piston Stirling cooler of the beta-type used to control the temperature of target 32. The displacer 38 moves sympathetically to the piston 36 motions, so control of the piston motions will control the displacer motions. The linear motor 34 drives piston 36 by its mechanical connection to the magnets 18. The amplitude of the piston motions must be controlled so that the moving parts do not collide with the mechanical stops 56 or 58. In the case of stop 58, the displacer 38 would collide with the interior top of the machine if driven to an excessive amplitude by the piston 36. The difference in the set-point temperature 60 and the target temperature obtained by temperature sensor 43, both applied to the summing junction 62, provides an error signal to the controller 46. The controller 46 sets the voltage for the driver 44 that provides the input to the linear motor 34. The driver 44 extracts the linear motor terminal current, voltage and phase between the voltage and current. These values are communicated to a microcomputer which processes the magnet amplitude recovery equations described above. Consequently, the control system operates according to the following logic:

1. If the target temperature is higher than the set point temperature, increase piston amplitude by increasing voltage (increases cooling capacity). If the target temperature is lower than the set point temperature, reduce piston amplitude by reducing voltage.
2. Recover piston amplitude.
3. Compare recovered piston amplitude to a stored set point maximum amplitude.
4. If the recovered amplitude is greater than the set point maximum amplitude, reduce the piston amplitude by reducing voltage until piston amplitude is no greater than the set point maximum amplitude.

LIST OF EQUATION CONSTANTS AND VARIABLES AND FIGURE REFERENCE NUMBERS $\alpha$ is the motor constant in Volts seconds per meter or Newtons per Amp $\omega$ is the machine operating angular frequency in radians per second X is the displacement amplitude of the armature and its component parts.

$R_S$ represents losses due to eddy currents and hysteresis induced by motion of the magnets reciprocating in the gap with the windings open-circuited.

$R_{dc}$ represents the Ohmic loss in the coil.

$\Delta R_{external}$ represents induced losses in the surrounding structure of the motor.

$R_{ac}$ represents the induced losses due to magnetic motion lumping together the losses of $R_S$ and $R_{dc}$.

L is the inductance of the motor mainly due to the coil windings.

$V_{ind}$ is the open circuit voltage generated by the magnet motion (i.e. induced in the coil).

$(V_{ind})_I$ is the phasor component of $V_{ind}$ in the I direction.

$(V_{ind})_L$ is the phasor component of $V_{ind}$ in the L direction.

$V_{appl}$ is the applied terminal voltage.

I and $I_m$ are the terminal and motor currents, respectively.

$j\omega L$ is the impedance of L 10 linear motor coil
11 reciprocating armature
12 iron core
13 coil terminals
14 iron core air gap
15 voltage applied to coil
16 ring support structure 18 permanent magnets (side by side segments or continuous ring)
20 outer part of core
22 inner part of core
24 actual measured displacement amplitude
26 recovered displacement amplitude [FIG. 4, equations (3)-(7)]
28 recovered displacement amplitude [FIG. 5, equations (4), (8), (9) and (7)]
30 free piston Stirling cooler
32 target (e.g. freezer)
34 linear motor (FIG. 8)
36 Stirling cooler piston
37 Stirling cooler cylinder
38 Stirling cooler displacer
40 Stirling cooler regenerator
42 Stirling cooler heat exchanger
43 temperature sensor
44 driver circuit
46 controller
48 piston amplitude X recovery
50 displacement amplitude summing junction
52 recovered amplitude correlation for the equivalent circuit of FIG. 4
54 recovered amplitude correlation for the equivalent circuit of FIG. 5
56 mechanical stop at which Stirling cooler piston can collide.
58 mechanical stop at which Stirling cooler displacer can collide
60 set-point temperature
62 summing junction for temperature control This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. However, the same or equivalent functions and features may be accomplished by different embodiments that are also intended to be encompassed within the spirit and scope of the invention and that various modifications may be adopted without departing from the invention or scope of the following claims.

The invention claimed is:

1. A method for detecting the displacement amplitude X of a reciprocating armature of an alternating current, linear motor or linear alternator for controlling the reciprocation of the armature, the motor or alternator having a stator including a coil with a pair of coil terminals and wound around a ferromagnetic core with air gaps, the motor or alternator also having magnets fixed to the armature and positioned for reciprocating through the gaps, the motor or alternator also having a motor constant $\alpha$, an equivalent resistance $R_{dc}$ representing resistive losses in the coil, an equivalent resistance $\Delta R_{external}$ representing induced losses in structures surrounding the motor or alternator and an equivalent resistance $R_s$ representing losses due to eddy currents and hysteresis induced by motion of the magnets with the coils open circuited, wherein the method comprises:

(a) sensing the amplitude of alternating voltage $V_{appl}$ at the coil terminals;
(b) sensing the amplitude of alternating current I through the coil terminals;
(c) sensing the phase angle $\phi_{pf}$ between said voltage and said current;
(d) calculating $I_m$ according to the equation $$I_m = I - \frac{V_{appl}}{R_s}$$

(e) calculating $(V_{ind})_I$ according to the equation $$(V_{ind})_I = V_{appl} \cos \phi_{pf} - (R_{dc} + \Delta R_{external})I_m$$

(f) calculating $(V_{ind})_L$ according to the equation $$(V_{ind})_L = V_{appl} \sin \phi_{pf} - L\omega I_m$$

(g) calculating the displacement amplitude X according to the equation $$X = \frac{1}{\omega \alpha} \sqrt{(V_{ind})_I^2 + (V_{ind})_L^2}$$

wherein $\omega$ is the radian frequency of $V_{appl}$.

2. The method according to claim 1 and further comprising:
(a) determining a motor or alternator armature displacement amplitude $X_c$ at which the armature or a structure fixed to the armature collides with a stationery structure;
(b) selecting and storing a motor or alternator armature displacement amplitude $X_{max}$ that is less than $X_c$;
(b) repeatedly performing said calculation of the displacement amplitude X; and
(c) limiting the displacement amplitude of the motor or alternator to maintain a displacement amplitude $X \leq X_{max}$.

3. A method for detecting the displacement amplitude X of a reciprocating armature of an alternating current, linear motor or linear alternator for controlling the reciprocation of the armature, the motor or alternator having a stator including a coil with a pair of coil terminals and wound around a ferromagnetic core with air gaps, the motor or alternator also having magnets fixed to the armature and positioned for reciprocating through the gaps, the motor or alternator also having a motor constant $\alpha$, an equivalent resistance $R_{ac}$ representing resistive losses in the coil and losses due to eddy currents and hysteresis induced by motion of the magnets with the coils open circuited, and an equivalent resistance $\Delta R_{external}$ representing induced losses in structures surrounding the motor or alternator, wherein the method comprises:

(a) sensing the amplitude of alternating voltage $V_{appl}$ at the coil terminals;
(b) sensing the amplitude of alternating current I through the coil terminals;
(c) sensing the phase angle $\phi_{pf}$ between said voltage and said current;
(d) calculating $(V_{ind})_I$ according to the equation $$(V_{ind})_I = V_{appl} \cos \phi_{pf} - (R_{ac} + \Delta R_{external})I$$

(e) calculating $(V_{ind})_L$ according to the equation $$(V_{ind})_L = V_{appl} \sin \phi_{pf} - L\omega I$$

(f) calculating the displacement amplitude X according to the equation $$X = \frac{1}{\omega \alpha} \sqrt{(V_{ind})_I^2 + (V_{ind})_L^2}$$

wherein $\omega$ is the radian frequency of $V_{appl}$.

4. The method according to claim 3 and further comprising:
(a) determining a motor or alternator armature displacement amplitude $X_c$ at which the armature or a structure fixed to the armature collides with a stationery structure;
(b) selecting and storing a motor or alternator armature displacement amplitude $X_{max}$ that is less than $X_c$;
(b) repeatedly performing said calculation of the displacement amplitude X; and
(c) limiting the displacement amplitude of the motor or alternator to maintain a displacement amplitude $X \leq X_{max}$.

5. A freezer comprising a free piston Stirling cooler mechanically linked to and driven by a reciprocating armature of an alternating current, linear motor, the linear motor having a stator including a coil with a pair of coil terminals and wound around a ferromagnetic core with air gaps, the motor also having magnets fixed to the armature and positioned for reciprocating through the gaps, the motor also having a motor constant $\alpha$, an equivalent resistance $R_{dc}$ representing resistive losses in the coil, an equivalent resistance $\Delta R_{external}$ representing induced losses in structures surrounding the motor and an equivalent resistance $R_s$ representing losses due to eddy currents and hysteresis induced by motion of the magnets with the coils open circuited, the freezer having a motor controller comprising:
(a) a voltage sensor connected to the coil terminals and configured for sensing the amplitude of an alternating voltage $V_{appl}$ at the coil terminals;
(b) a current sensor connected is series with a coil terminal and configured for sensing the amplitude of an alternating current I through the coil terminals;
(c) a phase detector circuit connected to the coil terminals and configured for sensing the phase angle $\phi_{pf}$ between said voltage and said current;
(d) a microcomputer circuit configured for
(i) calculating $I_m$ according to the equation $$I_m = I - \frac{V_{appl}}{R_s}$$

(ii) calculating $(V_{ind})_I$ according to the equation $(V_{ind})_I = V_{appl} \cos \emptyset_{pf} - (R_{dc} + \Delta R_{external}) I_m$ (iii) calculating $(V_{ind})_L$ according to the equation $(V_{ind})_L = V_{appl} \sin \emptyset_{pf} - L \omega I_m$ (iv) calculating the displacement amplitude X according to the equation $$X = \frac{1}{\omega \alpha} \sqrt{(V_{ind})_I^2 + (V_{ind})_L^2}$$

wherein $\omega$ is the radian frequency of $V_{appl}$ and
(v) limiting the displacement amplitude X of the motor to less than a selected and stored maximum displacement amplitude.

6. A freezer comprising a free piston Stirling cooler mechanically linked to and driven by a reciprocating armature of an alternating current, linear motor, the linear motor having a stator including a coil with a pair of coil terminals and wound around a ferromagnetic core with air gaps, the motor also having magnets fixed to the armature and positioned for reciprocating through the gaps, the motor also having a motor constant $\alpha$, an equivalent resistance $R_{ac}$ representing resistive losses in the coil and losses due to eddy currents and hysteresis induced by motion of the magnets with the coils open circuited, and an equivalent resistance $\Delta R_{external}$ representing induced losses in structures surrounding the motor or alternator, the freezer having a motor controller comprising:
(a) a voltage sensor connected to the coil terminals and configured for sensing the amplitude of an alternating voltage $V_{appl}$ at the coil terminals;
(b) a current sensor connected is series with a coil terminal and configured for sensing the amplitude of an alternating current I through the coil terminals;
(c) a phase detector circuit connected to the coil terminals and configured for sensing the phase angle $\phi_{pf}$ between said voltage and said current;
(d) a microcomputer circuit configured for
(i) calculating $(V_{ind})_I$ according to the equation $(V_{ind})_I = V_{appl} \cos \emptyset_{pf} - (R_{ac} + \Delta R_{external}) I$ (ii) calculating $(V_{ind})_L$ according to the equation $(V_{ind})_L = V_{appl} \sin \emptyset_{pf} - L \omega I$ (ii) calculating the displacement amplitude X according to the equation $$X = \frac{1}{\omega \alpha} \sqrt{(V_{ind})_I^2 + (V_{ind})_L^2}$$

wherein $\omega$ is the radian frequency of $V_{appl}$ and
(iv) limiting the displacement amplitude X of the motor to less than a selected and stored maximum displacement amplitude.

* * * * *